US009462815B2

(12) United States Patent
Adams et al.

(10) Patent No.: US 9,462,815 B2
(45) Date of Patent: Oct. 11, 2016

(54) FLAVOR DISPENSING SYSTEMS

(71) Applicants: Rex Adams, Tempe, AZ (US); Edwin Wold, Mesa, AZ (US)

(72) Inventors: Rex Adams, Tempe, AZ (US); Edwin Wold, Mesa, AZ (US)

( * ) Notice: Subject to any disclaimer, the term of this patent is extended or adjusted under 35 U.S.C. 154(b) by 74 days.

(21) Appl. No.: 14/594,132

(22) Filed: Jan. 11, 2015

(65) Prior Publication Data

US 2015/0264943 A1  Sep. 24, 2015

Related U.S. Application Data

(60) Provisional application No. 61/955,799, filed on Mar. 20, 2014.

(51) Int. Cl.
| | |
|---|---|
| A47J 43/16 | (2006.01) |
| A22C 17/00 | (2006.01) |
| A23L 1/22 | (2006.01) |
| A23L 1/318 | (2006.01) |
| A22C 9/00 | (2006.01) |

(52) U.S. Cl.
CPC ........... *A22C 17/0053* (2013.01); *A22C 9/001* (2013.01); *A23L 1/22008* (2013.01); *A23L 1/3182* (2013.01); *A47J 43/16* (2013.01); *A23V 2002/00* (2013.01)

(58) Field of Classification Search
CPC ... A22C 17/0053; A22C 9/001; A47J 43/16; A23L 1/3182; A23L 1/22008; A23V 2002/00
USPC ............................................ 99/532; 206/232
See application file for complete search history.

(56) References Cited

U.S. PATENT DOCUMENTS

| | | | | |
|---|---|---|---|---|
| 3,051,368 A * | 8/1962 | Schneider | ............... | B65D 75/12 383/104 |
| 3,074,612 A * | 1/1963 | Schneider | ............... | B65D 75/50 229/103.1 |
| 3,144,976 A * | 8/1964 | Freshour | ................ | B65D 75/20 206/229 |
| 3,545,604 A * | 12/1970 | Gunther, Jr. | ........... | B65D 77/08 206/217 |
| 3,568,870 A * | 3/1971 | Elston | .................. | B65D 77/283 215/229 |
| 3,711,011 A * | 1/1973 | Kugler | ............... | B65D 75/5838 222/541.9 |
| 3,746,197 A * | 7/1973 | Sather | ................. | B65D 77/283 215/388 |
| 3,754,469 A * | 8/1973 | Gasior | ............... | A22C 17/0053 99/494 |
| 3,770,185 A * | 11/1973 | Reeves | ................. | B65D 5/068 229/103.1 |
| 3,799,914 A * | 3/1974 | Schmit et al. | ....... | B65D 75/008 215/376 |
| 4,258,067 A * | 3/1981 | Stoll | ..................... | A23B 4/325 141/329 |
| 4,291,617 A * | 9/1981 | Miller | .................... | A47J 27/04 126/369 |

(Continued)

*Primary Examiner* — Eric Stapleton
(74) *Attorney, Agent, or Firm* — Integrity Patent Group, PLC; Edwin Wold

(57) ABSTRACT

An apparatus for marinating foods; the flavor dispensing system is used to improve the ease, convenience and reliability of dispensing flavorings into comestibles. The device is a flexible container with marinade or other fluid stored within the flexible container, and a dispensing needle suitable for injection dispensing. The container assembly serves to safely store the dispensing needle within the confines of the flexible container during non-use periods. The flexible container is able to be sealed to promote content longevity in store-shelf life.

18 Claims, 6 Drawing Sheets

(56) References Cited

U.S. PATENT DOCUMENTS

| | | | | |
|---|---|---|---|---|
| 4,411,359 A * | 10/1983 | Franco | B65D 77/283 | 206/217 |
| 4,448,316 A * | 5/1984 | Hiroshige | B65D 77/283 | 215/229 |
| 4,452,132 A * | 6/1984 | Miller | A47J 27/04 | 126/369 |
| 4,690,046 A * | 9/1987 | Corominas | A23B 4/285 | 99/533 |
| 4,806,021 A * | 2/1989 | Koudstaal | B65D 77/28 | 206/217 |
| 4,903,590 A * | 2/1990 | Muller | A23B 7/10 | 426/281 |
| 4,924,771 A * | 5/1990 | Langen | A23B 4/28 | 99/533 |
| 4,979,515 A * | 12/1990 | Briggs | A61B 5/1411 | 206/569 |
| 5,012,728 A * | 5/1991 | Langen | A23B 4/285 | 99/472 |
| 5,039,012 A * | 8/1991 | Inaba | A47G 21/18 | 215/388 |
| 5,150,815 A * | 9/1992 | Saklad | A47G 19/2227 | 215/12.1 |
| 5,190,049 A * | 3/1993 | Briggs | A61B 5/1411 | 600/573 |
| 5,253,779 A * | 10/1993 | Lee | B65D 77/283 | 215/388 |
| 5,275,284 A * | 1/1994 | Onotsky | A61F 13/0203 | 206/441 |
| 5,348,217 A * | 9/1994 | Bettle, Jr. | B65D 5/70 | 215/388 |
| 5,353,955 A * | 10/1994 | Kaufman | A47G 19/2266 | 206/217 |
| 5,385,264 A * | 1/1995 | Kaufman | A47G 19/2266 | 215/388 |
| 5,437,389 A * | 8/1995 | Kaufman | A47G 19/2266 | 206/217 |
| 5,607,081 A * | 3/1997 | Levy | A47L 13/26 | 15/104.93 |
| 5,773,060 A * | 6/1998 | Smith | A23B 4/285 | 426/231 |
| 5,782,344 A * | 7/1998 | Edwards | B65B 9/2028 | 206/217 |
| 5,833,368 A * | 11/1998 | Kaufman | B65D 75/5838 | 383/202 |
| 5,873,656 A * | 2/1999 | Arkins | B65D 75/58 | 229/204 |
| D410,838 S * | 6/1999 | Berman | B65D 5/70 | D9/710 |
| 5,941,642 A * | 8/1999 | Darmstadter | B65D 75/5811 | 383/104 |
| 5,996,481 A * | 12/1999 | Townsend | A22C 17/0053 | 99/487 |
| D420,900 S * | 2/2000 | Berman | B65D 5/70 | D9/710 |
| 6,041,579 A * | 3/2000 | Savoury | B65B 9/2028 | 53/236 |
| 6,076,968 A * | 6/2000 | Smith | B65D 75/008 | 383/104 |
| D429,459 S * | 8/2000 | Berman | B65D 5/70 | D9/707 |
| 6,116,446 A * | 9/2000 | Haughton | B65D 77/28 | 215/355 |
| D433,625 S * | 11/2000 | Berman | B65D 5/70 | D9/710 |
| D434,976 S * | 12/2000 | Berman | B65D 5/70 | D9/710 |
| 6,164,825 A * | 12/2000 | Larkin | B65D 75/008 | 383/104 |
| D436,847 S * | 1/2001 | Berman | B65D 5/70 | D9/710 |
| D436,848 S * | 1/2001 | Berman | B65D 5/70 | D9/710 |
| D437,549 S * | 2/2001 | Berman | B65D 5/70 | D9/710 |
| 6,220,756 B1 * | 4/2001 | Darmstadter | B65D 75/5811 | 383/104 |
| D452,144 S * | 12/2001 | Tedeschi, Jr. | B65D 5/70 | D9/707 |
| 6,334,711 B1 * | 1/2002 | Risgalla | B65D 75/5833 | 383/205 |
| 6,405,646 B2 * | 6/2002 | Thomas | A23B 4/285 | 99/532 |
| 6,481,889 B2 * | 11/2002 | Delsahut | B65D 81/03 | 383/202 |
| D470,406 S * | 2/2003 | Espinel | B65D 5/70 | D9/707 |
| D470,407 S * | 2/2003 | Espinel | B65D 5/70 | D9/707 |
| D470,755 S * | 2/2003 | Espinel | B65D 5/70 | D9/707 |
| D470,756 S * | 2/2003 | Espinel | B65D 5/70 | D9/707 |
| D470,757 S * | 2/2003 | Espinel | B65D 5/70 | D9/707 |
| 6,578,470 B2 * | 6/2003 | Backus | A21C 15/007 | 426/281 |
| 6,652,144 B2 * | 11/2003 | Stefandl | B65D 77/283 | 383/104 |
| 6,667,081 B1 * | 12/2003 | Aoki | B65D 75/5805 | 206/218 |
| D485,748 S * | 1/2004 | Murray | B65D 5/70 | D9/707 |
| 6,673,301 B2 * | 1/2004 | Cargile | B65D 35/08 | 156/203 |
| 6,789,467 B2 * | 9/2004 | Johnston, Jr. | A61D 1/025 | 604/144 |
| 6,840,161 B2 * | 1/2005 | Backus | A21C 15/007 | 426/281 |
| 6,981,614 B2 * | 1/2006 | Niggemyer | B65D 75/5883 | 222/107 |
| D519,848 S * | 5/2006 | Kirou | B65D 5/70 | D9/707 |
| 7,036,692 B2 * | 5/2006 | Krohn | B65D 35/08 | 222/521 |
| D558,594 S * | 1/2008 | Kirou | B65D 5/70 | D9/707 |
| 8,206,033 B2 * | 6/2012 | Sato | B29C 45/14336 | 383/104 |
| 8,251,568 B2 * | 8/2012 | Burkard | B65D 75/5883 | 206/222 |
| 8,523,440 B2 * | 9/2013 | Walker | B65D 33/24 | 383/202 |
| 8,642,051 B2 * | 2/2014 | Stillman | A47G 19/2205 | 424/400 |
| 2002/0012689 A1 * | 1/2002 | Stillman | A47G 19/2222 | 424/439 |
| 2004/0089629 A1 * | 5/2004 | Villaescusa | A47G 19/2266 | 215/388 |
| 2005/0224419 A1 * | 10/2005 | Wien | A23F 3/20 | 210/681 |
| 2007/0029334 A1 * | 2/2007 | Bagley | B65D 75/54 | 220/705 |
| 2007/0125744 A1 * | 6/2007 | Samman | B65D 25/205 | 215/388 |
| 2009/0180718 A1 * | 7/2009 | Walker | B65D 33/24 | 383/202 |
| 2009/0214743 A1 * | 8/2009 | Shin | A23L 2/04 | 426/599 |
| 2009/0304873 A1 * | 12/2009 | Magnoni | B65D 75/5883 | 426/122 |
| 2014/0220181 A1 * | 8/2014 | Stillman | A47G 19/2222 | 426/61 |
| 2015/0056339 A1 * | 2/2015 | Vaes | A47G 19/2222 | 426/115 |

\* cited by examiner

FLAVOR DISPENSING SYSTEMS

CROSS-REFERENCE TO RELATED APPLICATION

The present application is related to and claims priority from prior provisional application Ser. No. 61/955,799, filed Mar. 20, 2014 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of dispensing containers and more specifically relates to flavor dispensing systems.

2. Description of the Related Art

Marination is the process of soaking comestibles in a seasoned, often acidic, liquid before cooking. Marination originally alluded to the use of brine in the pickling process, which led to the technique of adding flavor by immersion in liquid. The liquid in question, the 'marinade', can be either acidic (made with ingredients such as vinegar, lemon juice, or wine) or enzymatic (made with ingredients such as pineapple, papaya or kiwifruit). In addition to these ingredients, a marinade often contains oils, herbs, and spices to further flavor the food items. Marination is commonly used to flavor foods and to tenderize tougher cuts of meat and to add 'juiciness' to lean cuts of meat; lean cuts are desirable in that they are healthier to consume. The process may last seconds or days. Different marinades are used in different cuisines. Flavorful and juicy foods are desirable to eat.

Raw red meat, fish, and chicken however may contain harmful bacteria which may contaminate the marinade if soaked therein. Marinating may be done in the refrigerator to inhibit bacterial growth; this may clutter refrigerators or create cross-contamination. The container used for marinating should be glass or food safe plastic. Metal, including pottery glazes which can contain lead, reacts with the acid in the marinade and should be avoided. To avoid these above-mentioned problems some individuals may use syringes to inject marinade into the flesh of the meat to obtain better results. This may be inconvenient and messy since the marinade is not easily poured into the syringe. A neat and efficient means for marinating is desirable; one that does not introduce bacteria to the comestible and is readily sellable to the public at large.

Various attempts have been made to solve the above-mentioned problems such as those found in U.S. Pat. No. 5,833,368, U.S. Design Pat. No. D470,755; and U.S. Pub. No. 2007/0029334. This art is representative of dispensing containers. None of the above inventions and patents, taken either singly or in combination, is seen to describe the invention as claimed.

Ideally, a flavor dispensing system should provide convenient dispensing means and, yet would operate reliably and be manufactured at a modest expense. Thus, a need exists for a reliable flavor dispensing system to avoid the above-mentioned problems.

BRIEF SUMMARY OF THE INVENTION

In view of the foregoing disadvantages inherent in the known dispensing container art, the present invention provides a novel flavor dispensing system. The general purpose of the present invention, which will be described subsequently in greater detail is to provide a user-friendly and safe means for dispensing liquid products for flavoring into comestibles.

A flavor dispensing system is disclosed herein, in a preferred embodiment, comprising: a container assembly having a flexible container having a front sidewall, a rear sidewall (both joined about an edge), a bottom end (with a bottom edge), a top end (with a top edge), an inner volume, and a spout assembly; a protective tube insert (having a first end with a first aperture, a second end, and an interior volume); a dispensing needle (having a distal end, a proximate end, a length, and at least one flow-aperture); and a cap with a top-hole; wherein the flavor dispensing system comprises the container assembly. Ingredients lists and products logos may be printed or otherwise affixed to the front sidewall and rear sidewall.

The container assembly comprises in functional combination the flexible container, the protective tube insert, the dispensing needle, and the cap with the top-hole. The flexible container is defined by the front sidewall, the rear sidewall, the bottom end and the top end, enclosing the inner volume suitable for holding a viscous fluid such as marinade. A seam (formed during manufacturing through heat or adhesion processes) causes the front sidewall, the rear sidewall, the bottom end, the top end to form the flexible container in a cost-effective manner of manufacture and permits easy filling of contents along the product filling line. The flexible container comprises a pillow-profile in this particular embodiment preferably with a heat-seamed periphery edge that is efficient to ship, store and display.

For one mode of display the bottom end of the flexible container comprises a hanging aperture for display-hanging of the container assemblies; a sombrero-hole (or round hole) suitable for a hook-hanger to pass therethrough such as those used on aisle-ends in supermarkets. The present invention is also designed such that multiple bags can be sequentially stacked vertically in a row in a box that may be opened and set on a store shelf.

Referring now again to the flexible container for use; the inner volume of the flexible container is accessible via the spout assembly for filling; the cap is removably coupleable to the spout assembly after the protective tube insert and dispensing needle have been inserted into the spout assembly. The container assembly, as such, is sealed after filling ready to be shipped.

The container assembly is disposable in preferred embodiments to promote food safety for consumers (limits multiple uses where the food may become contaminated), and convenience of use; the present invention being recyclable so as not to create a substantial environmental footprint. The flexible container preferably comprises foil laminate (and other recyclable materials) but may comprise other materials as per the relative acidity of contents stored therein. Certain embodiments may comprise insulation means. The flexible container comprises a flat-profile (before liquid is introduced to the inner volume and after the viscous fluid is entirely dispensed therefrom), thus is easy to ship and store. The flexible container may be stored in a flat position or stood vertically when filled.

The protective tube insert comprises the first end with the first aperture opposing the second end (terminal closed end) thereby defining the interior volume; the interior volume suitably-sized and shaped to receive the dispensing needle to prevent the dispensing needle from puncturing the flexible container. As such, the protective tube insert protects the flexible container from puncture (by the dispensing needle from within) during shipping and storage to minimize liability, injury and loss of product. The protective tube insert preferably comprises a tube-seal for sealing against an inner circumference of the spout assembly to isolate contents of the flexible container from ambient environmental conditions (thereby enabling sealing means). The protective tube insert is removed for marinade dispensing episodes and is able to be placed in again after use for safe disposal. The protective tube insert is designed to have a lip and a stepped profile to promote sealing and seals being mounted thereon.

Referring now to the dispensing needle; the dispensing needle is defined by the distal end and the proximate end; the length located between the distal end and the proximate end; the at least one flow-aperture located along the length of the dispensing needle such that the viscous fluid can be dispensed therefrom into a comestible, once pierced. Preferably multiple flow-apertures are employed such that the marinade can be evenly dispersed throughout the comestible, not concentrated in one location. The dispensing needle in preferred embodiments comprises an o-ring adjacent the proximate end for sealable coupling to the spout assembly during the marinade dispensing episodes; the spout assembly preferably comprising exterior threads to match interior threads on the cap. Exterior threads and interior threads may be single-, double-, or triple-start threads; other threads or fastening means may be employed.

The dispensing needle comprises poly-carbonate plastic in preferred embodiments which is sufficiently durable for use and not prone to breakage or splintering in the comestible during piercing and use; plastic dispensing needle is cost-effective and efficient in manufacturing processes. Alternate equivalent materials may be used in the dispensing needle such as ferrous, non-ferrous, alloys, other plastics, composites or the like. Other components may also comprise various materials as per application and contents held within the flexible container. Preferred sizing on dispensing needle is about 3-5 inches in length and less than ¼ inch wide such that the hole is small where piercing occurs and the length such that injection can be done well away from the surface deep into the meat. The dispensing needle may have a stepped proximate end suitable for strength and durability in use and for mounting gaskets/o-rings thereon. The dispensing needle preferably comprises a pierce-end that is solid and pointed for ease of injecting into the comestable.

The inner volume is structurally functional for preservedly-containing the viscous fluid able to be dispensed from the inner volume of the flexible container via the dispensing needle (through the spout). The inner volume is sealed (using at least two seals) to isolate the viscous fluid from an ambient environment so as to preserve the viscous fluid in a palatable state; wherein the viscous fluid comprises a marinade or the like.

The spout assembly is structured and arranged such that when the cap is coupled to the spout assembly a ninety degree corner is provided at an intersection of the top end and at least one side-end such that the container assembly is able to be set in a display box for convenient shelf-display in a stable up-right standing position while on display. This feature provides good options for the commercial seller of the product to maximize use of available shelf-space. The flexible container is not intended to be free-standing, but may be vertically stood with confines of a box or tray for display and alternately may be hung freely via a peg or hook, as desired. Other versions may be free-standing. During non-use stored durations the viscous fluid is able to be safely and sealingly stored within the bag container; during use the viscous fluid is able to travel from the inner volume of the bag, through the spout, into the dispensing needle through an aperture-channel running inside and along the length of the dispensing needle (between the distal end and the proximate end); the viscous fluid able to egress from near the distal end into a comestible in such fashion. The distal end is closed to a pierce-point; fluid is not able to travel out the end and meat flesh or vegetable flesh is not able to clog the distal end during piercing and subsequent use.

The spout assembly receives (in series modular configuration) the protective tube insert, the dispensing needle, and the cap, respectively. The cap may comprise a grip outer surface, a tamper-indicator-lip and a stick-on cover-seal for closing off the top-hole (until ready for use wherein the dispensing needle is passed through the top-hole of the cap). The protective tube insert is able to be removed from the spout assembly for use, the dispensing needle able to be removed from the protective tube insert and turned (180 degrees) for insertion (pointed distal end first) through the top-hole of the cap; the cap and the dispensing needle in combination able to be reconnected to the spout assembly for piercing the comestible and dispensing the viscous fluid via squeezing the flexible container. As such a user, during an in-use condition, is able to squeeze-dispense the viscous fluid into the comestible to provide user-induced flavoring and moistening therein.

Certain embodiments may also have an integral bag/spout/needle assembly; wherein the bag may for example have a pull-out spout with a needle that is integral with the bag (pouch). Other variations are envisioned such as those having and bag/spout/needle assembly wherein the spout/needle is folded down adjacent the bag and manipulated accordingly for use. Valves and other sealing means may be used.

Flexible container may have about 4 oz capacity for use with ribs and chicken, but other flexible containers with larger capacity, 8 oz may be used with larger (and/or tougher/leaner) cuts of meat. The present invention may find use for example with margarita bag injection means, wine injection means, etc. Certain embodiments may have a 2-part bag wherein the inside of the comestible may be flavored and another attached bag that may be used for the favoring and tenderizing of the outside of the comestible.

The inner volume is structurally functional for preservedly-containing a viscous fluid (as sealed) able to be dispensed from the inner volume of the flexible container via the dispensing tube (when unsealed); wherein the distal end of the dispensing tube preferably comprises a pierce-end (likened to that of a needle/syringe). The dispensing needle preferably may comprise rigid plastic or other suitable equivalent material that is able to not bend significantly when piercing comestibles such as meat or vegetables, fruits, or the like.

The inner volume is sealed to isolate the viscous fluid (such as marinade or salad dressing mixtures or alcohol) from the ambient environment so as to preserve the viscous fluid in a stable palatable state. The viscous fluid for example may comprise a marinade, as previously mentioned and the comestible may comprise a meat. The comestible is not frozen (when being injected), such that it is semi-porous for fluid to enter therein for flavoring and tenderizing, moistening means. Use of the present invention is user-friendly and does not employ a great deal of time or expertise. Those with ordinary skill in the art will now appreciate that upon reading this specification and by their understanding the art of marinating as described herein, methods and ingredients of marinades will be understood by those knowledgeable in such art.

The flexible container is able to contain the viscous fluid in a room-temperature environment because the flexible container comprises a vacuum-sealable pouch. This feature provides that the marinade or other contents may not need to have preservatives incorporated into the solution (recipe). The container assembly is recyclable; the flexible container preferably comprises foil laminate; wherein the flexible container comprises a flat-profile when the viscous fluid is entirely dispensed therefrom such that it is convenient and efficient for shipping and storing prior to filling with liquid contents. This profile provides that when being recycled it doesn't require a large amount of space for storage.

Medical applications may be envisioned such as for use in insulin dispensing and bee sting kits. Other general medical and non-medical applications are envisioned. Pet injections for medicine may also be performed using the present invention.

A kit is described for use and sale including: a plurality of the container assemblies each comprising the marinade, and a set of user-preparation instructions. Displaying, and cooking instructions may also be included, as well as safe disposal thereof. Cook books and the like may also be included. Combination flavor packs or the like may be sold.

A method of using a flavor dispensing system is also disclosed herein comprising the steps of: removing a cap from a coupled relationship with a spout assembly on a flexible container, removing a dispensing needle from a protective tube insert, removing the protective tube insert from the spout assembly, inserting the dispensing needle through a top-hole in the cap, coupling the dispensing needle and the cap in combination to the spout assembly, piercing a comestible with a distal end of the dispensing needle, and squeeze-dispensing a viscous fluid (marinade or the like) through the dispensing needle into the comestible. The method may further comprise the step of removing a stick-on cover-seal from over the top-hole in the cap (used for sealing). The method may further comprise the step of rolling the flexible container sequentially as the marinade is dispersed into the comestible (to allow complete evacuation).

When injecting, the user should be patient. The mix (viscous fluid) should be injected slowly and evenly. The goal being to push the marinade into the muscle fibers of the meat. The meat must be allowed sufficient time to absorb the mixture, and use of a firm, even pressure is desirable. Dispensing needle (injector) may be plastic, stainless steel or may comprise other materials. The dispensing tube may be side-mounted in alternate embodiments; the dispensing tube because of its length is able to penetrate deep into the meat and when removed the hole (because of the small diameter of the needle of less than ¼ inch) folds in again to retain the flavoring within, especially as the meat cooks; the hole is quickly resealed because of its small diameter.

The present invention holds significant improvements and serves as a flavor dispensing system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, flavor dispensing systems, constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to a dispensing means and more particularly to a flavor dispensing system as used to improve the ease and reliability of dispensing flavorings into comestibles.

Figure 1:
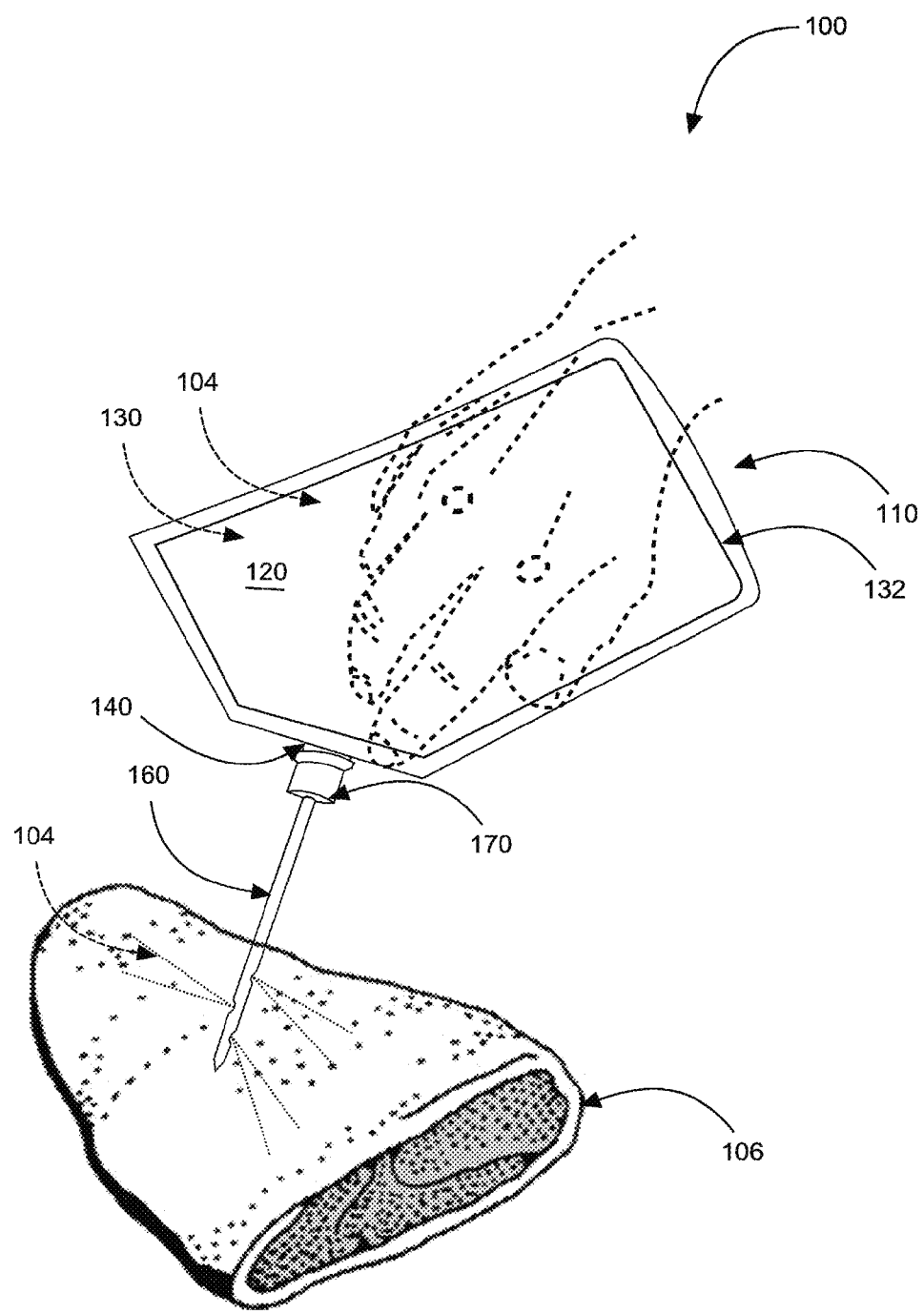
FIG. 1 shows a perspective view illustrating a flavor dispensing system in an in-use condition marinating a comestible according to an embodiment of the present invention.

Referring to the drawings by numerals of reference there is shown in FIGS. 1-4B, flavor dispensing system 100 comprising: container assembly 110 (having flexible container 120 having front sidewall 122, rear sidewall 124, bottom end 126, top end 128, inner volume 130, and spout assembly 140); protective tube insert 150 (having first end 152 with first aperture 154, second end 156, and interior volume 158); dispensing needle 160 (having distal end 162, proximate end 164, length 166, and at least one flow-aperture 168); and cap 170 with top-hole 172; wherein flavor dispensing system 100 comprises container assembly 110, as shown in FIG. 1.

Figure 2A:
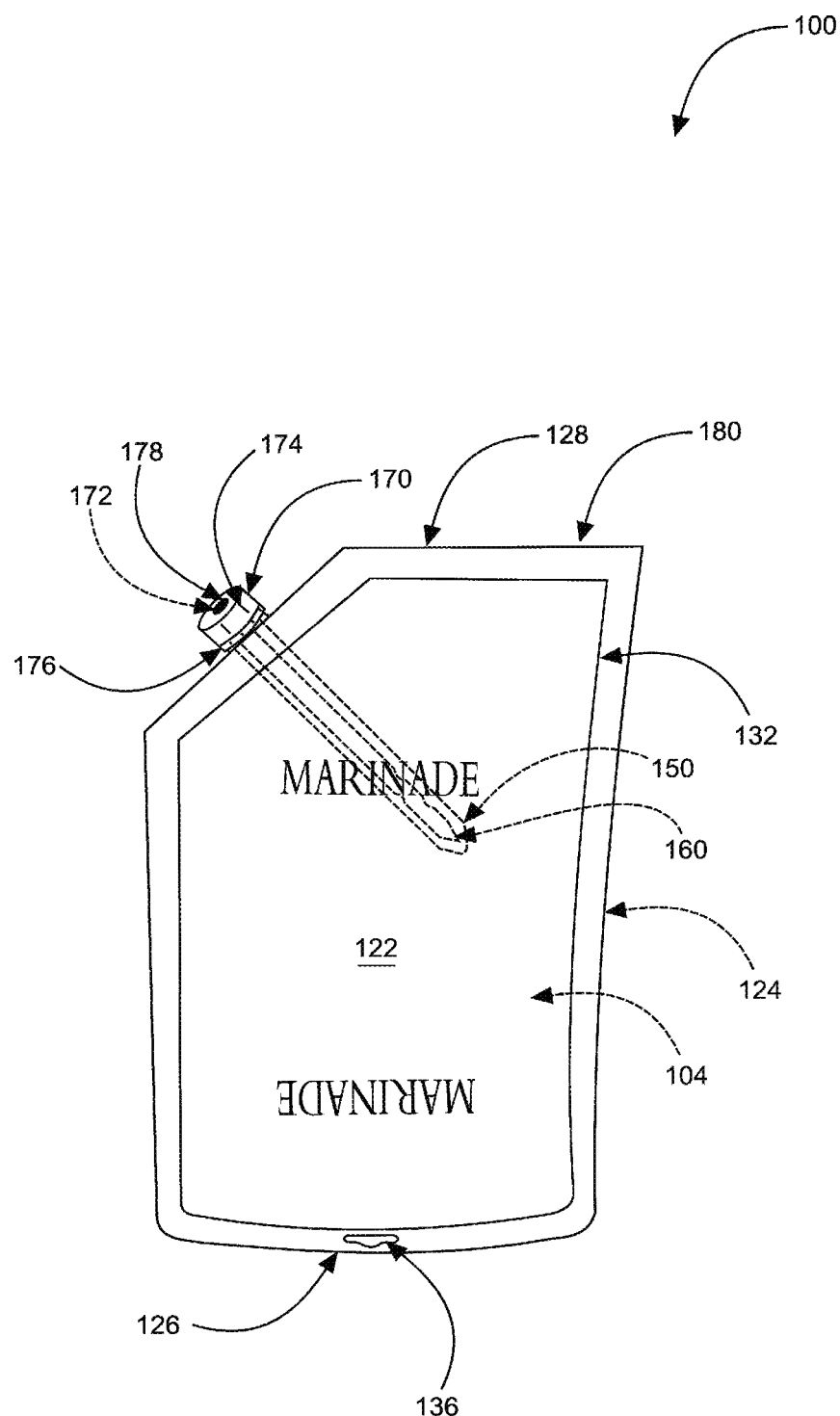
FIG. 2A is a front view illustrating a container assembly of the flavor dispensing system with marinade packaged therein according to an embodiment of the present invention.

FIG. 2A is a front view illustrating container assembly 110 of flavor dispensing system 100 with marinade (viscous fluid 104) packaged therein according to an embodiment of the present invention. Container assembly 110 comprises in functional combination flexible container 120, protective tube insert 150, dispensing needle 160, and cap 170 with top-hole 172; wherein flexible container 120 is defined by front sidewall 122, rear sidewall 124, bottom end 126 and top end 128, enclosing inner volume 130 suitable for holding a viscous fluid 104. Flexible container 120 of flavor dispensing system 100 comprises a pillow-profile with a heat-seamed periphery edge. Flexible container 120 comprises foil laminate in preferred embodiments; flexible container 120 comprises a flat-profile when viscous fluid 104 is entirely dispensed therefrom.

Seam 132 causes front sidewall 122, rear sidewall 124, bottom end 126, top end 128 to form flexible container 120; wherein inner volume 130 of flexible container 120 is accessible via spout assembly 140; cap 170 removably coupleable to spout assembly 140. Protective tube insert 150 comprises first end 152 with first aperture 154 opposing second end 156 defining interior volume 158; interior volume 158 suitably-sized to receive dispensing needle 160 to prevent dispensing needle 160 from puncturing flexible container 120. Protective tube insert 150 preferably comprises tube-seal 148 for sealing against inner circumference 142 of spout assembly 140 to isolate contents (viscous fluid 104) of flexible container 120 from ambient environmental conditions. Protective tube insert 150 protects flexible container 120 from puncture by dispensing needle 160 during shipping and storage; protective tube insert 150 is removed for the marinade dispensing episodes. Those with ordinary skill in the art will now appreciate that upon reading this specification and by their understanding the art of sealing as described herein, methods of sealing via gaskets or the like will be understood by those knowledgeable in such art.

Dispensing needle 160 is defined by distal end 162 and proximate end 164; length 166 located between distal end 162 and proximate end 164, the at least one flow-aperture 168 located along length 166 of dispensing needle 160 such that viscous fluid 104 can be dispensed therefrom into at least one comestible 106. Dispensing needle 160 comprises poly-carbonate plastic in preferred embodiments. Other embodiments may comprise other materials. Dispensing needle 160 preferably comprises o-ring 163 (or other suitably equivalent sealing means) adjacent proximate end 164 for sealable coupling to spout assembly 140 during marinade dispensing episodes, as shown in FIG. 1.

Figure 2B:
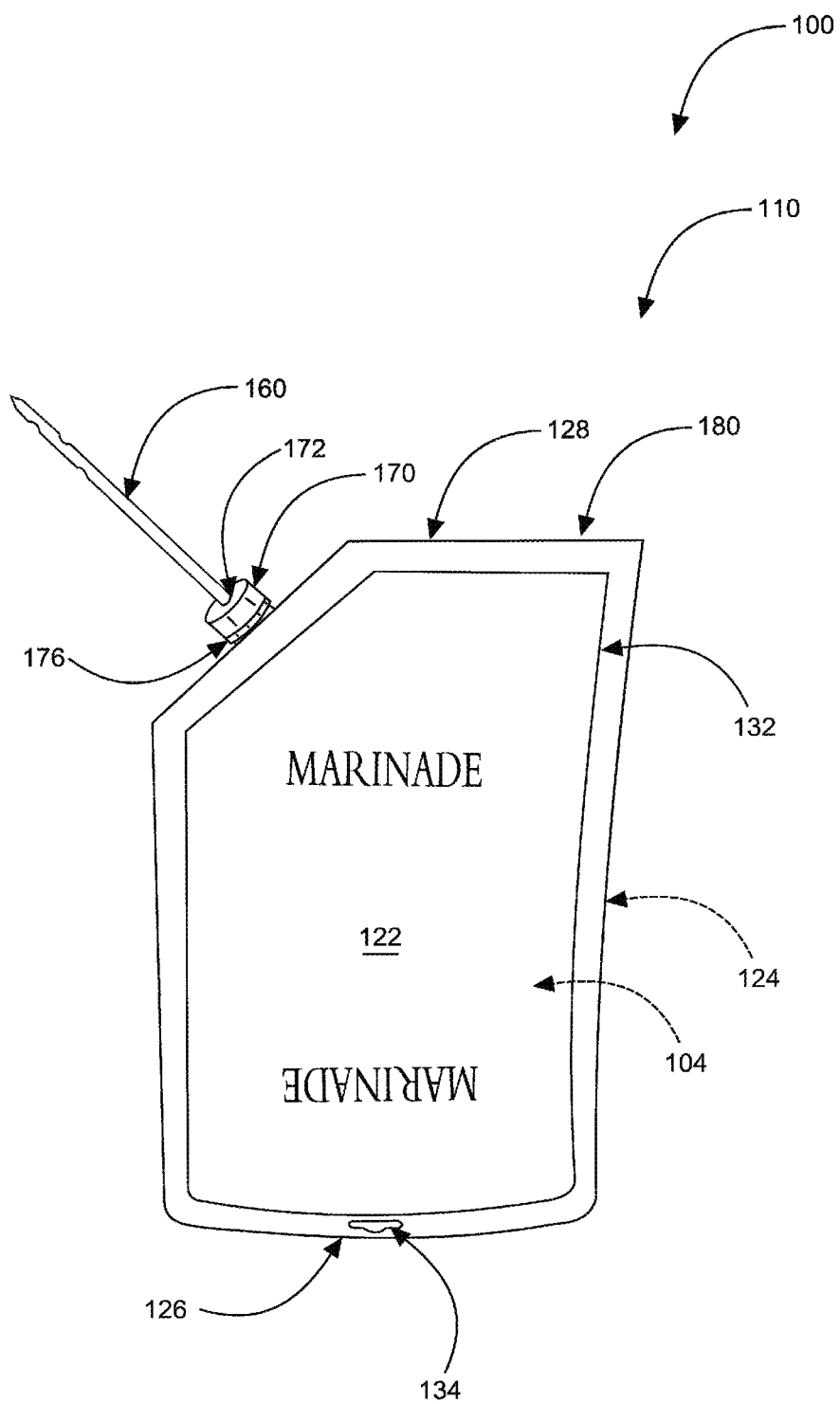
FIG. 2B is a front view illustrating the container assembly of the flavor dispensing system ready for use in dispensing of the marinade packaged therein according to an embodiment of the present invention of FIGS. 1 and 2A.

Inner volume 130 is structurally functional for preservedly-storing viscous fluid 104 (organic or other) able to be dispensed from inner volume 130 of flexible container 120 via dispensing needle 160; wherein inner volume 130 is sealed to isolate viscous fluid 104 from an ambient environment so as to preserve viscous fluid 104 in a palatable state safe for consumption. Viscous fluid 104 is able to travel as a liquid through aperture-channel 167 running inside and along length 166 of dispensing needle 160 between distal end 162 and proximate end 164; viscous fluid 104 able to egress from flow-aperture(s) 168 located near distal end 162 into comestible 106. FIG. 2B shows a front view illustrating container assembly 110 of flavor dispensing systems 100 ready for use in dispensing of the marinade packaged therein according to an embodiment of the present invention of FIGS. 1 and 2A.

Figures 3A, 3B:
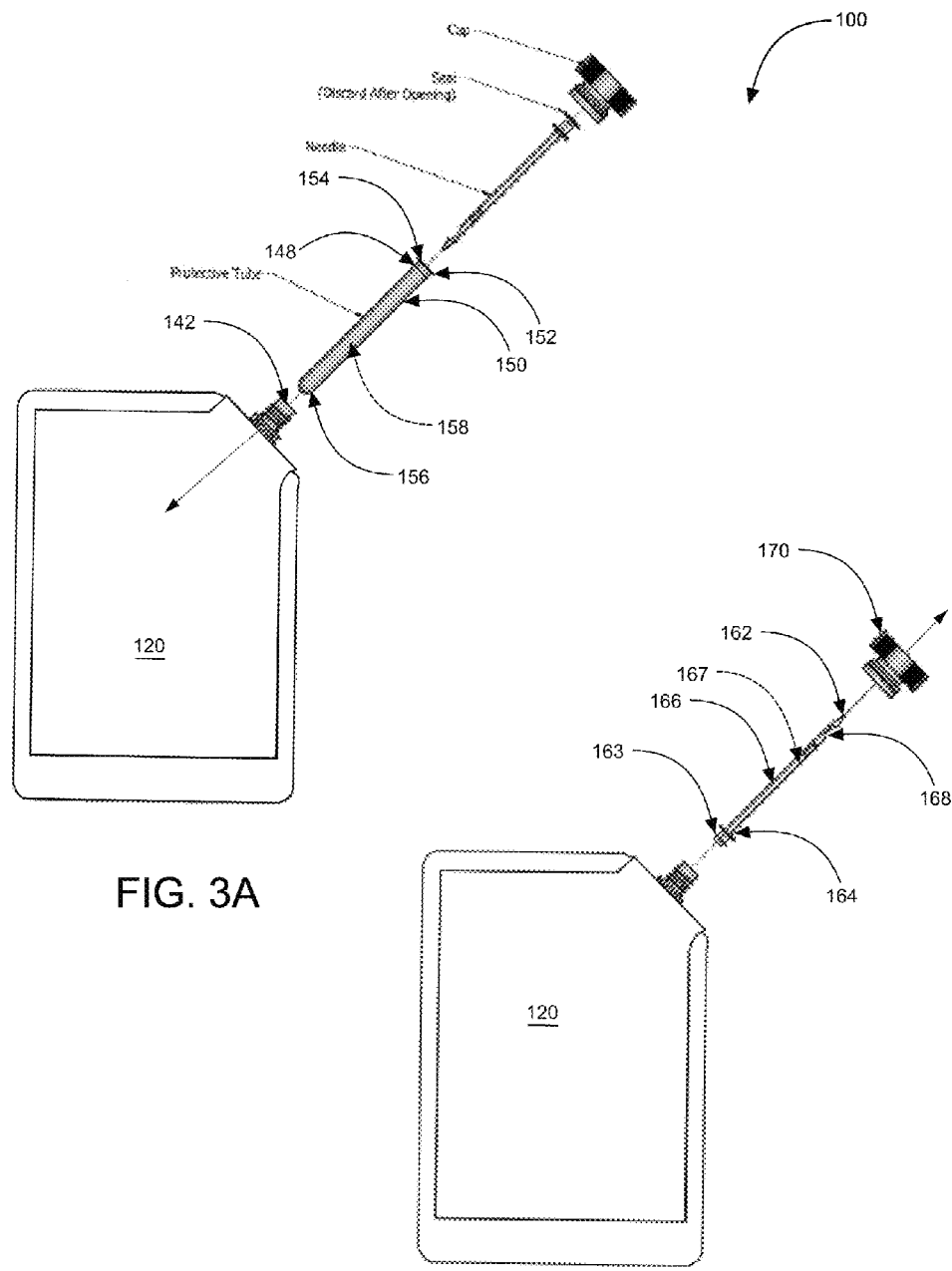
FIG. 3A is an exploded view illustrating the container assembly (as would be assembled after being filled with the marinade) according to an embodiment of the present invention.
FIG. 3B is an exploded view illustrating the container assembly (as to be assembled ready for dispensing marinade) according to an embodiment of the present invention.

Referring now to FIG. 3A, an exploded view illustrating container assembly 110 (as would be assembled after being filled with the marinade) according to an embodiment of the present invention. Spout assembly 140, as designed, receives in series protective tube insert 150, dispensing needle 160, and cap 170. Protective tube insert 150 is able to be removed from spout assembly 140; dispensing needle 160 able to be removed from protective tube insert 150 and turned for insertion through top-hole 172 of cap 170; cap 170 and dispensing needle 160 in combination able to be reconnected (threadingly coupled) to spout assembly 140 for piercing comestible 106 and dispensing viscous fluid 104 via squeezing flexible container 120, as shown in FIG. 1. FIG. 1 shows a user, during an in-use condition being able to squeeze-dispense viscous fluid 104 into comestible 106 to provide user-induced flavoring therein.

FIG. 3B shows an exploded view illustrating container assembly 110 (as to be assembled ready for dispensing marinade) according to an embodiment of the present invention. Cap 170 may comprise grip outer surface 174, tamper-indicator-lip 176 and stick-on cover-seal 178 for closing off top-hole 172 until ready for use wherein dispensing needle 160 is passed through top-hole 172 of cap 170.

Figure 4A:
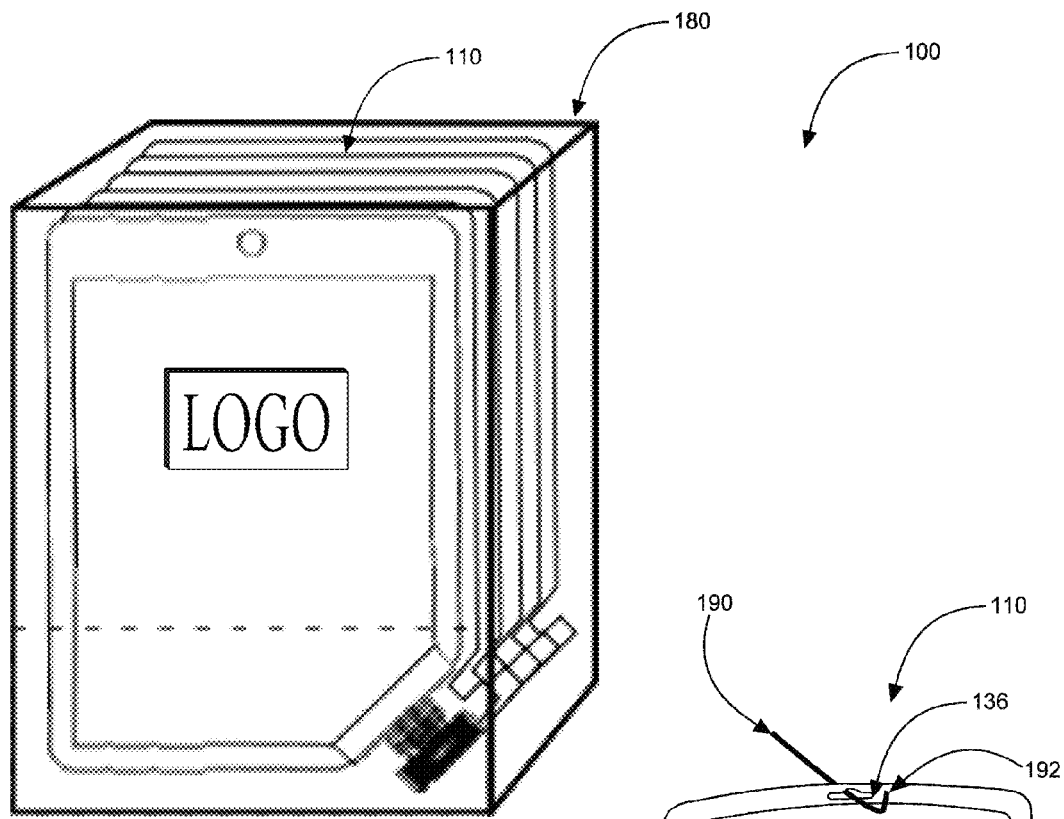
FIG. 4A is a front view illustrating the container assembly as boxed for display according to an embodiment of the present invention.

Referring now again to spout assembly 140; FIG. 4A shows a front view illustrating container assembly 110 as boxed for display according to an embodiment of the present invention. Spout assembly 140 is structured and arranged such that when cap 170 is coupled to spout assembly 140 a ninety degree corner is provided at an intersection of top end 128 and a side-end such that container assembly 110 is able to be set in display box 180 for shelf-display in an up-right standing position (top-edge down, as shown) while on display. It should be understood that viscous fluid 104 as disclosed herein may comprise a marinade or other liquid or semi-liquid product. Container assembly 110 is disposable in preferred embodiments; alternate embodiments may be suitable for re-use.

Figure 4B:
FIG. 4B is a perspective view illustrating the container assembly as hung on a peg for display according to an embodiment of the present invention.

FIG. 4B is a perspective view illustrating container assembly 110 as hung on peg 190 for display according to an embodiment of the present invention. Bottom end 126 of flexible container 120 comprises hanging aperture 134 for display-hanging of the container assemblies 110. Hanging aperture 134 in preferred embodiments may comprise sombrero-hole 136 suitable for hook-hanger 192 to pass therethrough. Hanging aperture 134 may comprise a round-hole (not shown) suitable for a hook-hanger 192 to pass therethrough in alternate embodiments.

A kit for sale may include: a plurality of the container assemblies 110 each comprising the marinade, and a set of user-preparation (pre-cooking) instructions. Cook books and the like may also be included. Displaying, and cooking instructions may also be included, as well as safe disposal thereof. The kit has instructions such that functional relationships are detailed in relation to the structure of the invention (such that the invention can be used, maintained, or the like in a preferred manner). Flavor dispensing system 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different color combinations, parts may be sold separately, etc., may be sufficient.

Figure 5:
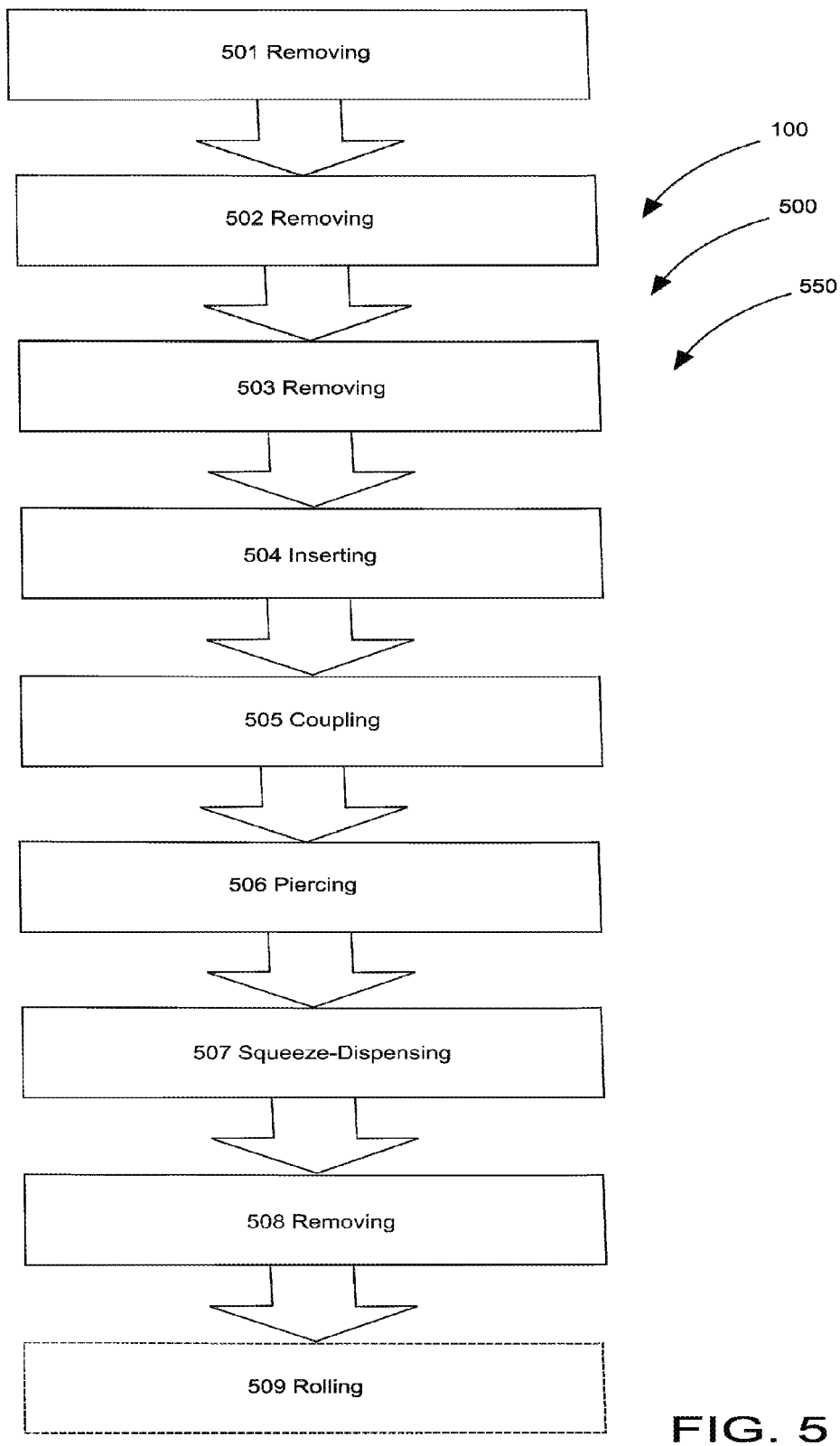
FIG. 5 is a flowchart illustrating a method of use for the flavor dispensing system according to an embodiment of the present invention of FIGS. 1-4B.

FIG. 5 is a flowchart 550 illustrating method of use 500 for flavor dispensing system 100 according to an embodiment of the present invention of FIGS. 1-4B.

A method of using (method of use 500) for flavor dispensing system 100 comprises the steps of: step one 501 removing cap 170 from a coupled relationship with spout assembly 140 on flexible container 120, step two 502 removing dispensing needle 160 from protective tube insert 150, step three 503 removing protective tube insert 150 from spout assembly 140, step four 504 inserting dispensing needle 160 through top-hole 172 in cap 170, step five 505 coupling dispensing needle 160 and cap 170 in combination to spout assembly 140, step six 506 piercing comestible 106 with distal end 162 of dispensing needle 160, step seven 507 and squeeze-dispensing viscous fluid 104 (marinade or the like) through dispensing needle 160 into comestible 106 from inner volume 130 of flexible container 120. The method 500 may further comprise the step eight 508 of removing stick-on cover-seal 178 from over top-hole 172 in cap 170 (used for sealing) before step four 504. The method 500 may further comprise the step nine 509 of rolling flexible container 120 sequentially as the marinade (viscous fluid 104) is dispersed into comestible 106 (to allow complete evacuation).

It should be noted that step 509 is an optional step and may not be implemented in all cases. Optional steps of method 500 are illustrated using dotted lines in FIG. 5 so as to distinguish them from the other steps of method 500.

It should be noted that the steps described in the method of use can be carried out in many different orders according to user preference. The use of "step of" should not be interpreted as "step for", in the claims herein and is not intended to invoke the provisions of 35 U.S.C. §112, ¶ 6. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A flavor dispensing system comprising:
   a container assembly having;
      a flexible container having;
         a front sidewall;
         a rear sidewall;
         a bottom end;
         a top end;
         an inner volume; and
         a spout assembly;
      a protective tube insert having;
         a first end with a first aperture;
         a second end; and
         an interior volume;
      a dispensing needle having;
         a distal end;
         a proximate end;
         a length; and
         at least one flow-aperture; and
      a cap with a top-hole;
   wherein said flavor dispensing system comprises said container assembly;
   wherein said container assembly comprises in functional combination said flexible container, said protective tube insert, said dispensing needle, and said cap with said top-hole;
   wherein said flexible container is defined by said front sidewall, said rear sidewall, said bottom end and said top end, enclosing said inner volume suitable for holding a viscous fluid;
   wherein a seam causes said front sidewall, said rear sidewall, said bottom end, said top end to form said flexible container;
   wherein said inner volume of said flexible container is accessible via said spout assembly, said cap removably coupleable to said spout assembly;
   wherein said protective tube insert comprises said first end with said first aperture opposing said second end defining said interior volume, said interior volume suitably-sized to receive said dispensing needle to prevent said dispensing needle from puncturing said flexible container;
   wherein said dispensing needle is defined by said distal end and said proximate end, said length located between said distal end and said proximate end, said at least one flow-aperture located along said length of said dispensing needle such that said viscous fluid can be dispensed therefrom into a comestible;
   wherein said inner volume is structurally functional for preservedly-containing said viscous fluid able to be dispensed from said inner volume of said flexible container via said dispensing needle;
   wherein said inner volume is sealed to isolate said viscous fluid from an ambient environment so as to preserve said viscous fluid in a palatable state;
   wherein said viscous fluid is able to travel through an aperture-channel running inside and along said length of said dispensing needle between said distal end and said proximate end, said viscous fluid able to egress from said distal end into a comestible;
   wherein said spout assembly receives in series said protective tube insert, said dispensing needle, and said cap;
   wherein said protective tube insert is able to be removed from said spout assembly, said dispensing needle able to be removed from said protective tube insert and turned for insertion through said top-hole of said cap, said cap and said dispensing needle in combination able to be reconnected to said spout assembly for piercing said comestible and dispensing said viscous fluid via squeezing said flexible container; and
   wherein a user, during an in-use condition, is able to squeeze-dispense said viscous fluid into said comestible to provide user-induced flavoring therein.

2. The flavor dispensing system of claim 1 wherein said spout assembly is structured and arranged such that when said cap is coupled to said spout assembly a ninety degree corner is provided at an intersection of said top end and a side-end such that said container assembly is able to be set in a display box for shelf-display in an up-right standing position while on display.

3. The flavor dispensing system of claim 1 wherein said viscous fluid comprises a marinade.

4. The flavor dispensing system of claim 1 wherein said container assembly is disposable.

5. The flavor dispensing system of claim 1 wherein said bottom end of said flexible container comprises a hanging aperture for display-hanging of said container assemblies.

6. The flavor dispensing system of claim 5 wherein said hanging aperture comprises a round-hole suitable for a hook-hanger to pass therethrough.

7. The flavor dispensing system of claim 5 wherein said hanging aperture comprises a sombrero-hole suitable for a hook-hanger to pass therethrough.

8. The flavor dispensing system of claim 6 wherein said flexible container comprises a pillow-profile with a heat-seamed periphery edge.

9. The flavor dispensing system of claim 1 wherein said dispensing needle comprises poly-carbonate plastic.

10. The flavor dispensing system of claim 1 wherein said protective tube insert comprises a tube-seal for sealing against an inner circumference of said spout assembly to isolate contents of said flexible container from ambient environmental conditions.

11. The flavor dispensing system of claim 1 wherein said dispensing needle comprises an o-ring adjacent said proximate end for sealable coupling to said spout assembly during marinade dispensing episodes.

12. The flavor dispensing system of claim 1 wherein said protective tube insert protects said flexible container from puncture by said dispensing needle during shipping and storage.

13. The flavor dispensing system of claim 11 wherein said protective tube insert is removed for said marinade dispensing episodes.

14. The flavor dispensing system of claim 9 wherein said cap comprises a grip outer surface, a tamper-indicator-lip and a stick-on cover-seal for closing off said top-hole until ready for use wherein said dispensing needle is passed through said top-hole of said cap.

15. The flavor dispensing system of claim 1 wherein said flexible container comprises foil laminate.

16. The flavor dispensing system of claim 1 wherein said flexible container comprises a flat-profile when said viscous fluid is entirely dispensed therefrom.

17. A flavor dispensing system comprising:
   a container assembly having;
      a flexible container having;
         a front sidewall;
         a rear sidewall;
         a bottom end;
         a top end;
         an inner volume; and
         a spout assembly;
      a protective tube insert having;
         a first end with a first aperture;
         a second end; and
         an interior volume;
      a dispensing needle having;
         a distal end;
         a proximate end;
         a length; and
         at least one flow-aperture; and
      a cap with a top-hole;
   wherein said flavor dispensing system comprises said container assembly;
   wherein said container assembly comprises in functional combination said flexible container, said protective tube insert, said dispensing needle, and said cap with said top-hole;
   wherein said flexible container is defined by said front sidewall, said rear sidewall, said bottom end and said top end, enclosing said inner volume suitable for holding a viscous fluid;
   wherein a seam causes said front sidewall, said rear sidewall, said bottom end, said top end to form said flexible container;
   wherein said flexible container comprises a pillow-profile with a heat-seamed periphery edge;
   wherein said bottom end of said flexible container comprises a hanging aperture for display-hanging of said container assemblies;
   wherein said hanging aperture comprises a sombrero-hole suitable for a hook-hanger to pass therethrough;
   wherein said inner volume of said flexible container is accessible via said spout assembly, said cap removably coupleable to said spout assembly;
   wherein said container assembly is disposable;
   wherein said flexible container comprises foil laminate;
   wherein said flexible container comprises a flat-profile when viscous fluid is entirely dispensed therefrom;
   wherein said protective tube insert comprises said first end with said first aperture opposing said second end defining said interior volume, said interior volume suitably-sized to receive said dispensing needle to prevent said dispensing needle from puncturing said flexible container;
   wherein said protective tube insert protects said flexible container from puncture by said dispensing needle during shipping and storage;
   wherein said protective tube insert comprises a tube-seal for sealing against an inner circumference of said spout assembly to isolate contents of said flexible container from ambient environmental conditions;
   wherein said protective tube insert is removed for marinade dispensing episodes;
   wherein said dispensing needle is defined by said distal end and said proximate end, said length located between said distal end and said proximate end, said at least one flow-aperture located along said length of said dispensing needle such that said viscous fluid can be dispensed therefrom into a comestible;
   wherein said dispensing needle comprises an o-ring adjacent said proximate end for sealable coupling to said spout assembly during said marinade dispensing episodes;
   wherein said dispensing needle comprises poly-carbonate plastic;
   wherein said inner volume is structurally functional for preservedly-containing said viscous fluid able to be dispensed from said inner volume of said flexible container via said dispensing needle;
   wherein said inner volume is sealed to isolate said viscous fluid from an ambient environment so as to preserve said viscous fluid in a palatable state;
   wherein said viscous fluid comprises a marinade;
   wherein said spout assembly is structured and arranged such that when said cap is coupled to said spout assembly a ninety degree corner is provided at an intersection of said top end and a side-end such that said container assembly is able to be set in a display box for shelf-display in an up-right standing position while on display;

wherein said viscous fluid is able to travel through an aperture-channel running inside and along said length of said dispensing needle between said distal end and said proximate end, said viscous fluid able to egress from said distal end into a comestible;

wherein said spout assembly receives in series said protective tube insert, said dispensing needle, and said cap;

wherein said cap comprises a grip outer surface, a tamper-indicator-lip and a stick-on cover-seal for closing off said top-hole until ready for use wherein said dispensing needle is passed through said top-hole of said cap;

wherein said flexible container is not free-standing;

wherein said protective tube insert is able to be removed from said spout assembly, said dispensing needle able to be removed from said protective tube insert and turned for insertion through said top-hole of said cap, said cap and said dispensing needle in combination able to be reconnected to said spout assembly for piercing said comestible and dispensing said viscous fluid via squeezing said flexible container; and wherein a user, during an in-use condition, is able to squeeze-dispense said viscous fluid into said comestible to provide user-induced flavoring therein.

18. The flavor dispensing system of claim 17 further comprising a kit including:

a plurality of said container assemblies each comprising said marinade; and a set of user-preparation instructions.

* * * * *